UNITED STATES PATENT OFFICE.

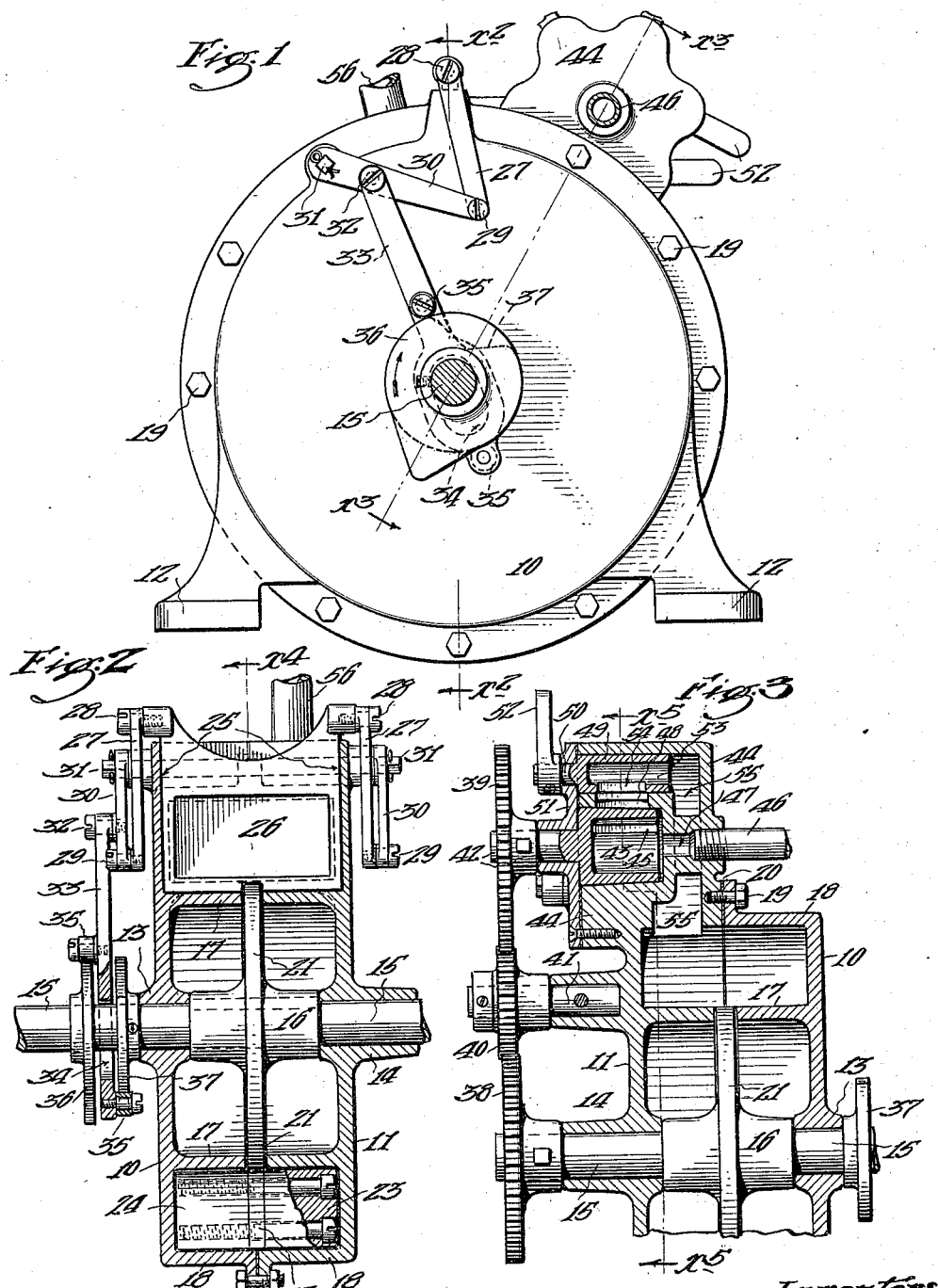

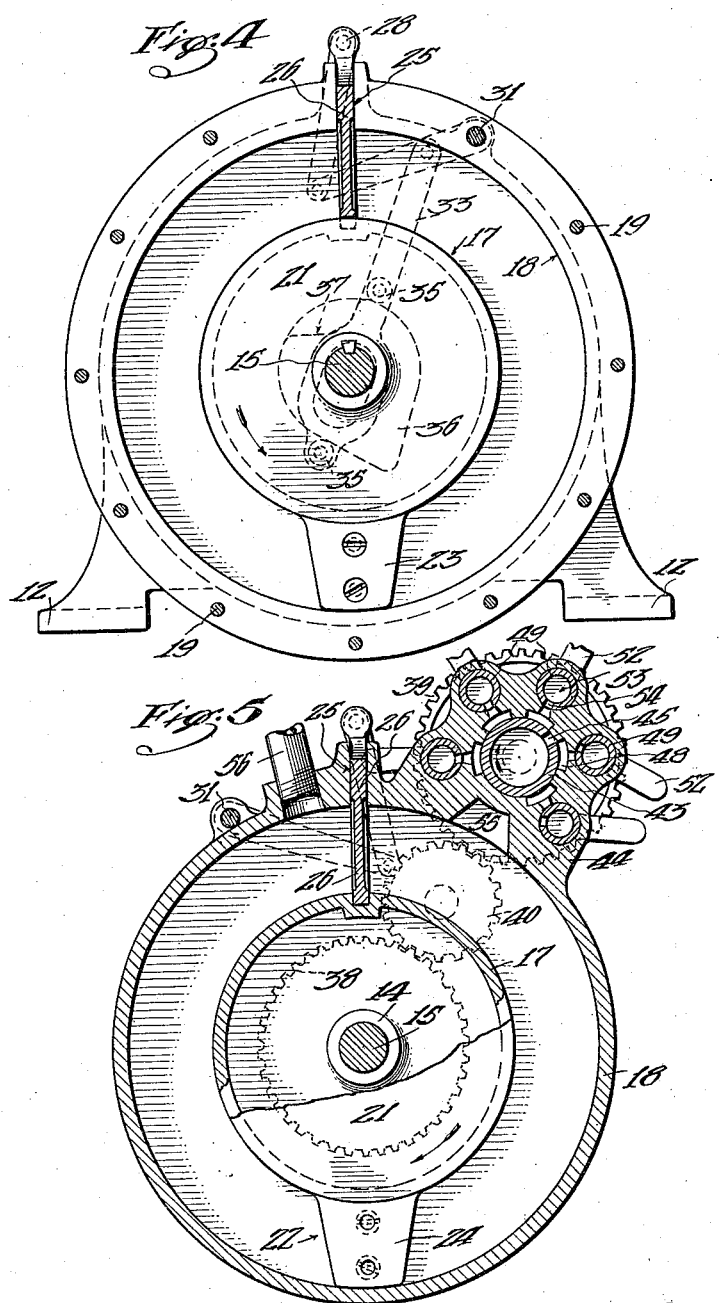

JOHN L. WEBB, OF SAWTELLE, AND CHARLES C. MURDY, OF WESTMINSTER, CALIFORNIA.

ROTARY MACHINE.

1,139,937.  Specification of Letters Patent.  Patented May 18, 1915.

Application filed March 23, 1914. Serial No. 826,817.

*To all whom it may concern:*

Be it known that we, JOHN L. WEBB and CHARLES C. MURDY, both citizens of the United States, the former residing at Sawtelle, in the county of Los Angeles, State of California, and the latter residing at Westminster, in the county of Orange, State of California, have invented a new and useful Rotary Machine, of which the following is a specification.

Our invention relates to rotary engines and pumps, and its principal object is to provide such a rotary engine or pump which will have a high economy and be mechanically simple.

A further object is to provide in such an engine or pump a gate valve which will coöperate with a rotary piston and which will be so constructed as to be fluid tight.

A further object is to provide in an engine for elastic fluids a valve mechanism whereby these fluids may be worked expansively.

Further objects will be evident from the following specification and from the annexed drawings.

In the drawings, which are for illustrative purposes only: Figure 1 shows an end view of one embodiment of our invention. Fig. 2 is a section on the line $x^2$—$x^2$ of Fig. 1. Fig. 3 is a section on the line $x^3$—$x^3$ of Fig. 1. Fig. 4 is a section on the line $x^4$—$x^4$ of Fig. 2. Fig. 5 is a section on the line $x^5$—$x^5$ of Fig. 3.

In these drawings, an external casing is formed of two members 10 and 11, the member 10 being provided with feet 12 upon which the engine is supported.

Bearings 13 and 14 are formed on the members 10 and 11 and support a shaft 15 which carries a rotor 16 rigidly keyed thereon.

Inner flanges 17 and outer flanges 18 are provided on the members 10 and 11, the outer flanges 18 meeting and being secured together by means of bolts 19 and rendered tight by means of packing 20. The space between the flanges 17 and 18 and the walls of the members 10 and 11 forms an annular cylinder. The inner flanges 17 have a small space left between them through which a disk 21 formed on the rotor 16 projects, the flanges 17 forming a gas tight joint with the disk 21.

The disk 21 is provided with a projection 22 to which are secured piston members 23 and 24, these members forming with the projection 22 a piston which fits tightly in the annular cylinder. The piston rotates in the direction indicated by the arrows and turns the shaft 15 through the rotor 16.

A slot 25 is formed in the upper part of the members 10 and 11 and a gate valve 26 slides in this slot extending completely across the annular cylinder, the members 10 and 11 being grooved so that this gate valve forms a tight closure for the cylinder when it is in the position shown in the drawings.

Links 27 are pivoted by means of screws 28 to the upper end of the gate valve 26 and pivoted by means of screws 29 to levers 30 which are rigidly secured on the squared ends of a shaft 31 which extends through bearings on the members 10 and 11 and connects the levers 30 so that they move together.

Pivoted by means of a pin 32 on one of the levers 30 is a connecting rod 33 which is slotted at 34 to surround and be guided by the shaft 15.

Rollers 35, mounted on suitable screws, are secured to either side of the connecting rod 33 and cams 36 and 37 secured rigidly to the shaft 15 act upon these rollers 35 and give the connecting rod 33 a reciprocating motion.

For the purpose of working the steam expansively when the above described apparatus is used as an engine we provide the valve structure shown in the drawings. A gear 38 is rigidly secured to the shaft 15 and drives a gear 39 through an idler gear 40 which turns freely on a shaft 41. The gear 39 is rigidly secured to a shaft 42 which is formed on an extension of a valve 43 which turns in a casing 44 cast integral with the member 11. The valve 43 has a slot 45, and a pipe 46 communicates through a passage 47 with the opening inside the valve 43. A series of ports 48 in the member 11 provide an open communication between the valve chamber in which the valve 43 turns, and a series of valve chambers in which stationary valves 49 are fitted. The stationary valves 49 are each provided with a shaft 50 which extends through a cover 51 of the casing 44, this cover also providing a bearing for the shaft 42. A series of handles 52 serve to regulate the position of the valves 49. These valves have an open chamber 53 in the center and a slot 54 formed in one side thereof. An opening 55 is cored in the casing 44 communicating with the interior of all the valves 49 and extending downwardly and communicating with the annular cylinder.

The method of operation of our invention when operated as a steam engine is as follows: Steam is admitted through the pipe 46 to the interior of the valve 43 which is turned by means of the gears 38, 39, and 40 from the shaft 15. As the valve 43 turns the slot 45 therein distributes steam to the ports 48. The handles 52 may be turned so that all the ports 48 communicate through the stationary valves 49 with the opening 55, or these valves may be turned so that the slots 54 therein do not register with the ports 48. In Fig. 5 the first three valves are shown in their open position, the last two being closed. As the valve 43 rotates by the first three ports 48 steam is admitted to the valves 49 and passes downwardly into the cylinder through the opening 55. After the slot 45 passes the port 48 which is in open communication with the last open stationary valve 49 there is no further admission of steam to the opening 55, and the steam which has been admitted to the annular cylinder works expansively. The steam in the annular cylinder acts between the gate valve 26 and the piston, tending to force the piston in the direction of the arrow. As the piston approaches the gate valve 26 the cam 37 raises the connecting rod 33 which actuates the gate valve 26 through the levers 30 and the links 27. The gate valve 26 is sufficiently raised to allow the piston to pass thereunder, the cam 36 thereafter forcing the gate valve 26 downward through the means above described. A pipe 56 is provided in open communication with the annular cylinder through which the exhaust steam may be ejected.

It is obvious that by reversing the rotation the above apparatus may be used as a pump, air or other elastic fluid being taken inwardly through the opening 55 and forced outwardly through the pipe 56. When used as a pump, however, it is advisable to omit the expansion valve mechanism 38 to 54, inclusive, and it is absolutely necessary to omit this expansion valve mechanism if water or other non-compressible fluid is pumped. It is also obvious that any of the well known forms of valve gear may be applied to the valves 49 in place of the operating handles 52 for the purpose of making the degree of expansion dependent upon the work to be performed.

We claim as our invention:

1. A rotary machine comprising casing members forming an annular cylinder, a shaft at the axis of said cylinder, a rotor on said shaft and projecting into said cylinder, a piston attached to the projection on said rotor, means for introducing and withdrawing fluid from said cylinder, a gate valve radially placed in said cylinder and forming a tight closure therewith, links connected to the outer end of said gate valve, levers actuating said links to move said gate valve in and out of the cylinder, a connecting rod attached to one of said levers, and means for actuating said connecting rod.

2. A rotary machine comprising casing members forming an annular cylinder, a shaft at the axis of said cylinder, a rotor on said shaft and projecting into said cylinder, a piston attached to the projection on said rotor, means for introducing and withdrawing fluid from said cylinder, a gate valve radially placed in said cylinder and forming a tight closure therewith, links connected to the outer end of said gate valve, levers actuating said links to move said gate valve in and out of said cylinder, a connecting rod pivoted at one end on one of said levers and having a slot in the other end surrounding and sliding on said shaft, two rollers on opposite sides of said connecting rod and on either side of said shaft, and two cams attached to said shaft and engaging said rollers to actuate said connecting rod.

3. A rotary machine comprising an annular cylinder, a piston mounted on a shaft and moving in said cylinder, a gate valve radially placed in said cylinder and forming a tight closure with the walls thereof, means for moving said gate valve in and out of the cylinder, means forming an exhaust opening into said cylinder, a valve driven from said shaft, walls forming a series of stationary ports through which the valve successively discharges an elastic fluid into said cylinder, and means for closing one or more of said ports.

4. A rotary machine comprising an annular cylinder, a piston mounted on a shaft and moving in said cylinder, a gate valve radially placed in said cylinder and forming a tight closure with the walls thereof, means for moving said gate valve in and out of the cylinder, means forming an exhaust opening into said cylinder, a valve driven from said shaft, walls forming a series of stationary ports through which the valve successively discharges an elastic fluid into said cylinder, a port valve adapted to close each of said ports, and means for regulating the position of said port valves.

In testimony whereof, we have hereunto set our hands at Los Angeles, California, this 16th day of March, 1914.

JOHN L. WEBB.
CHARLES C. MURDY.

In presence of—
FORD. W. HARRIS,
FRED A. MANSFIELD.

Copies of this patent may be obtained for five cents each, by addressing the "Commissioner of Patents, Washington, D. C."